United States Patent Office 2,912,362
Patented Nov. 10, 1959

2,912,362
PROCEDURE FOR OBTAINING SAPOGENINS FROM NATURAL UN-DRIED PRODUCTS

Luis Miramontes, Mexico City, Mexico, assignor to G. D. Searle & Co., Chicago, Ill., a corporation of Delaware No Drawing. Application March 6, 1957
Serial No. 646,950

2 Claims. (Cl. 195—32)

The present invention refers to the preparation on an industrial scale of sapogenins from the group classified as steroid sapogenins, which contain in their basic nuclear structure the ring system known as perhydrocyclopentanophenanthrene, by the use of vegetable plants without drying, and has as its objective the description of a procedure for the production on large scale of these important substances by the use of new methods, thus permitting their large scale conversion to the valuable steroid hormones.

There exist various methods for the separation of sapogenins from the plant species which contain them consisting of extracting by various organic solvents the dried and milled plants, followed by acid hydrolysis of the concentrated extracts, or by direct hydrolysis of the total vegetable material, with or without previous drying. These methods possess the common disadvantage of inefficiency and represent a very high cost, due to the enormous quantities of solvents and chemical substances required for their practice.

The procedure with which this application is concerned, and which will be described subsequently, has two very important advantages, for example: The quantities of solvent and chemical substances are reduced enormously, and the volume of raw material subjected to the above processes is much reduced.

This invention offers two main characteristics of novelty.

The first consists of separating the saponin (structural precursor of the sapogenin), which exists in the fresh plants, from the fibrous and other insoluble materials by means of grinding or crushing of and expressing from the fresh plants the total juice in which the saponin is contained; this is followed by washing with water of the residual pulp or bagasse in order to extract most of the remaining saponin (after which the wash waters are substantially free of unusable materials or other annoying complex organic impurities).

The second novel characteristic consists in maintaining the combined liquids so obtained at a temperature of 20–25° C. for 3 to 7 days in the presence of pectinolytic bacteria and bacteria which hydrolize cellulose and starch. These bacteria largely belong to the broad group producing microbial carbohydrases, e.g., Clostridium welchii, and which therefore hydrolize such materials as pectin, cellulose and starch. This incubation period has the effect of increasing the amount of sapogenin in the juice by biosynthesis of additional quantities of saponins above the normal level contained in the non-incubated juice. Simultaneously there occurs the formation of a voluminous precipitate which may later be separated from the liquid phase by filtration or centrifugation. This precipitate represents substantially all of the saponin content of the juice after fermentation, but in a chemically modified form. This modification of the chemical structure of the saponins consists of a partial degradation of the complex sugar sidechain to produce a much shorter and simpler sidechain with the useful result of reduction in water solubility and the consequent resultant formation of the precipitate mentioned above. The filter or centrifuge cake obtained by the collection of this precipitate has a high content of partially degraded saponins and represents an enormous reduction in volume and weight with respect to that of the fresh plant starting materials or with respect to that of the dried and milled plants commonly used in the prior art.

Another advantage of this procedure is that the enormous volumes of organic solvents required to obtain an extract by known procedures are completely eliminated and the desired saponin is obtained in a more convenient form for submission to a subsequent direct acid hydrolysis for obtaining the desired sapogenins.

The following description of the steps employed for this procedure is intended as an example only and is not to be construed as limiting the invention to the material described as raw material, nor does it exclude obvious secondary modifications which do not alter the desired result.

*Example A.*—One kilogram of fresh Dioscorea root was milled to a pulp and the juice expressed from this mass by the application of pressure. The residue or bagasse was resuspended in 0.5 liter of water and repressed. This operation was repeated several times until the majority of the saponin had been removed. The 2 to 3 liters of juice and washings so obtained were mixed and allowed to stand for four days at a temperature of 20–25° C. in the presence of bacteria (*Clostridium welchii*) which are pectinolytic and which hydrolize the cellulose and starches, during which time there was formed a voluminous precipitate which may later be separated by centrifugation or filtration. The precipitate was filtered and dried and gave 30 grams consisting principally of partially degraded saponins, and of minor amounts of pigments and fiber. By assay it was found that the fresh root contained 1 percent of Diosgenin, or in this case a total content of 10 grams. The expressed juice and washings contained 8.6 grams, representing a recovery of 86 percent. After fermentation it was seen that this amount had increased to 10.1 grams, showing an increase by virtue of biosynthesis. All of this amount was recovered (substantially) by filtration and resulted in a solid cake. On a dry weight basis this cake contained 30 percent of partially degraded saponin.

*Example B.*—The solid obtained in the above step was suspended in 300 mls. water, 100 mls. isopropyl alcohol and 120 mls. 35 percent hydrochloric acid. Isopropyl alcohol may be replaced by methyl or ethyl alcohol, but the former is preferred. The mixture was heated under reflux for four hours after which time the acid was neutralized by the addition of alkali. The neutralized suspension was totally precipitated by the recovery of alcohol and was then filtered. However, an alternative mode of precipitation can be effected by adding water to the neutralized suspension. As a variation of this hydrolysis step the solid may be suspended in 360 mls. water, 40 mls. alcohol (methyl, ethyl or preferably isopropyl) and 25 mls. concentrated commercial grade HCl and then heated at 100° C. for 90 minutes under pressure in a closed vessel, followed by neutralization and filtration as before. More generally, the solid obtained in the above step may be hydrolized with an acid (HCl, $H_2SO_4$, etc.) in the presence of either water or alcohol alone, with or without pressure heating, but in all variations pressure heating at 100° C. for 90 minutes in a closed vessel is preferable because it results in more complete hydrolysis.

*Example C.*—The filtered solids obtained in the preceding Step B are refluxed for 30 minutes with 500 mls. of carbon tetrachloride, ethylene dichloride, or preferably propylene dichloride, and filtered; repeating this procedure until extraction is complete. The combined extracts are then distilled to obtain a heavy paste and 25 mls. of monomethyl ether or ethylene glycol are added to effect crystallization under cooling. Monomethyl ether of ethylene glycol may be replaced with alcohol (methyl, ethyl or isopropyl) but the former is preferable. Filtration gives 8 to 9 grams of Diosgenin with a melting point of 198–202° C. and an optical rotation of −118° in chloroform.

What is clamed is:

1. A procedure for obtaining sapogenins from natural undried Dioscorea roots which comprises crushing the fresh plant material to reduce it to a pulp and expression of the pulp to obtain therefrom all of the juice; resuspension of the residual pulp in water to remove most of the saponin remaining in the pulp; a storage of the juice and the washings for 3 to 7 days at room temperature in the presence of bacteria capable of hydrolizing pectin, cellulose and starch; filtration of the total liquid to collect the precipitate.

2. A procedure according to the preceding claim in which the bacterium used is *Clostridium welchii*.

References Cited in the file of this patent

UNITED STATES PATENTS

| | | |
|---|---|---|
| 2,404,834 | Wagner | Oct. 8, 1946 |
| 2,686,752 | Wall et al. | Aug. 17, 1954 |
| 2,774,713 | Gould | Dec. 18, 1956 |
| 2,774,714 | Hershberg et al. | Dec. 18, 1956 |
| 2,784,144 | Krider et al. | Mar. 5, 1957 |
| 2,785,107 | Krider et al. | Mar. 12, 1957 |
| 2,798,025 | Spensley | July 2, 1957 |

FOREIGN PATENTS

| | | |
|---|---|---|
| 525,106 | Canada | May 15, 1956 |